(12) United States Patent
Irzyk

(10) Patent No.: US 10,901,210 B2
(45) Date of Patent: Jan. 26, 2021

(54) IMAGE-GENERATION DEVICE FOR A HEAD-UP DISPLAY AND METHOD FOR CONTROLLING SUCH A DEVICE

(71) Applicant: VALEO COMFORT AND DRIVING ASSISTANCE, Créteil (FR)

(72) Inventor: Michael Irzyk, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 46 days.

(21) Appl. No.: 16/315,667

(22) PCT Filed: Jun. 30, 2017

(86) PCT No.: PCT/EP2017/066398
§ 371 (c)(1),
(2) Date: Aug. 22, 2019

(87) PCT Pub. No.: WO2018/007268
PCT Pub. Date: Jan. 11, 2018

(65) Prior Publication Data
US 2020/0012098 A1  Jan. 9, 2020

(51) Int. Cl.
*G02B 27/01* (2006.01)
*B60K 35/00* (2006.01)
(Continued)

(52) U.S. Cl.
CPC ......... *G02B 27/0101* (2013.01); *B60K 35/00* (2013.01); *G02F 1/133603* (2013.01);
(Continued)

(58) Field of Classification Search
CPC ............... G02B 27/0101; G02B 27/01; G02F 1/133603; G02F 2001/133613; B60K 35/00; G03B 21/2006
See application file for complete search history.

(56) References Cited

U.S. PATENT DOCUMENTS

2005/0018308 A1* 1/2005 Cassarly ............ G02B 27/0081
359/630
2010/0220047 A1 9/2010 Adachi
(Continued)

FOREIGN PATENT DOCUMENTS

WO 2016070532 A1 5/2016

OTHER PUBLICATIONS

International Search Report and Written Opinion Issued in Corresponding PCT Application No. PCT/EP2017/066398, dated Sep. 21, 2017 (19 Pages with English Translation of International Search Report and Written Opinion).

*Primary Examiner* — Muhammad N Edun
(74) *Attorney, Agent, or Firm* — Osha Bergman Watanabe & Burton LLP

(57) ABSTRACT

The invention relates to an image-generation device (11) for a head-up display (10), comprising: a light source, a light modulator suitable for spatially modulating the light emitted by the light source, and a computer (13) suitable for controlling the light of source and the light modulator such that they generate an image. According to the invention, the light source is composed of a plurality of separate light elements, and the computer is able to modulate the light intensity emitted by each light element independently of the light intensity emitted by the other light elements.

12 Claims, 2 Drawing Sheets

(51) Int. Cl.
*G02F 1/13357* (2006.01)
*G03B 21/20* (2006.01)

(52) U.S. Cl.
CPC ............... *G03B 21/2006* (2013.01); *G02F 2001/133613* (2013.01)

(56) References Cited

U.S. PATENT DOCUMENTS

2012/0133673 A1   5/2012  Ninan
2016/0103263 A1   4/2016  Kazmierski et al.
2016/0252742 A1*  9/2016  Wakabayashi ..... G02B 27/4227
                                               345/8
2016/0299342 A1* 10/2016  Asai ................ G02B 19/0028

* cited by examiner

IMAGE-GENERATION DEVICE FOR A HEAD-UP DISPLAY AND METHOD FOR CONTROLLING SUCH A DEVICE

TECHNICAL FIELD TO WHICH THE INVENTION RELATES

The present invention relates generally to motor vehicle driving aid devices.

It relates more particularly to an image-generating device for head-up display, comprising:
- a light source,
- a light modulator adapted to spatially modulate the light emitted by the light source, and
- a computer adapted to control the light source and the light modulator so that they generate an image.

It relates also to a method for controlling such a device.

TECHNOLOGICAL BACKGROUND

To facilitate and make the driving of a motor vehicle safer, it is desirable to avoid having the driver be forced to divert his or her gaze from the road that he or she is taking.

For that, it is known practice to use a head-up display, adapted to project outside of the vehicle information (vehicle speed, direction to be followed, malfunctioning of the engine, presence of obstacle, etc.) at the height of the gaze of the driver.

Various head-up display technologies are known. Among these, the head-up displays with light modulation are known in particular.

Such head-up displays can for example comprise a liquid crystal screen and a backlighting device placed behind the screen. These elements thus make it possible to generate an image that can be projected into the visual field of the driver, for example via a fold back mirror and a semi-reflecting plate (commonly called "combiner") situated in the axis of the gaze of the driver.

In this technical solution, the backlighting device is provided to continually illuminate the back of the screen whereas the screen is designed to block the passage of the light in certain zones, in order to generate an image comprising the desired information.

Such a head-up display has the major drawback of significant electrical energy consumption. It is also observed that this consumption remains the same whatever the quantity of information to be displayed.

Another drawback is that the blocking by the screen of the light emitted by the backlighting device is not totally effective, so that a light halo can be observed on all of the combiner (called "postcard effect") which is at least not esthetically pleasing, and even a nuisance for the driver.

OBJECT OF THE INVENTION

In order to remedy the abovementioned drawbacks of the state of the art, the present invention proposes an image-generating device as defined in the introduction, in which the light source is formed by several distinct light elements, and in which the computer is adapted to modulate the light intensity emitted by each light element independently of the light intensities emitted by the other light elements.

Thus, by virtue of the invention, only the parts of the light modulator that have to display information are lit by the light elements of the light source. The other light elements are on the other hand left off, so that the parts of the light modulator that do not have to display any information are not lit.

In this way, the electrical consumption of the light source is greatly reduced. Moreover, since some of the light elements are switched off, the light halo visible on the combiner is reduced.

Other advantageous and nonlimiting features of the image-generating device according to the invention are as follows:
- an optical assembly is provided which is interposed between the light source and the light modulator and which conditions the light emitted by each light element to a corresponding effective zone of the light modulator;
- the optical assembly is such that each effective zone of the light modulator is distinct from the other effective zones and contiguous to other effective zones;
- the image to be generated being composed of different parts each adapted to be formed by one of the effective zones of the light modulator and by the corresponding light element, the computer comprises means for acquiring the image to be generated, detection means adapted to check whether, in each part of the image to be generated, there is information to be displayed, and means for controlling the light source adapted to illuminate only the light elements corresponding to the parts of the image in which there is information to be displayed;
- the light elements are situated in one and the same plane;
- all or some of the light elements are situated on a curved surface;
- the light elements are distributed in columns and in rows;
- at least three rows of light elements and at least four columns of light elements are provided;
- the light modulator comprises a transmissive screen and the light source is adapted to backlight said transmissive screen; or
- the light modulator comprises a reflective panel composed of flaps that can take two distinct states, namely a state in which the flap reflects the light received from the light source and a state in which the flap does not reflect the light received from the light source.

The invention relates also to a head-up display for a motor vehicle, which comprises an image-generating device as mentioned above and a projection system adapted to project said image into the visual field of the driver of the motor vehicle.

Also preferentially, the projection system comprises an at least partially reflecting plate, which is curved in order to have an image enlarging effect. It can be a fold back mirror (which makes it possible to direct the light beam in the desired direction), a combiner (which makes it possible to project the image into the visual field of the combiner), or even the windshield when it has a combiner function.

The invention relates also to a method for controlling an image-generating device as mentioned above, comprising:
- a step of acquisition of an image to be generated which comprises at least one piece of information,
- a step of segmentation of said image into different parts each adapted to be primarily illuminated by a corresponding light element, during which the computer checks whether, in each of the parts, all or part of said at least one piece of information is located therein, and
- a step of generation of said image, during which only the light elements corresponding to the parts of the image in which all or part of said at least one piece of information is located are controlled to be lit.

DETAILED DESCRIPTION OF AN EXEMPLARY EMBODIMENT

The following description with respect to the attached drawings, given as nonlimiting examples, will give a good understanding of what the invention consists of and how it can be produced.

In the attached drawings:

FIG. 1 shows a head-up display 10 intended for a vehicle, for example a motor vehicle.

This head-up display 10 comprises an image-generating device 11 and an optical projection assembly 12 that makes it possible to project the image generated by the image-generating device 11 into the visual field of the driver when his or her gaze is turned toward the road.

Figure 1:
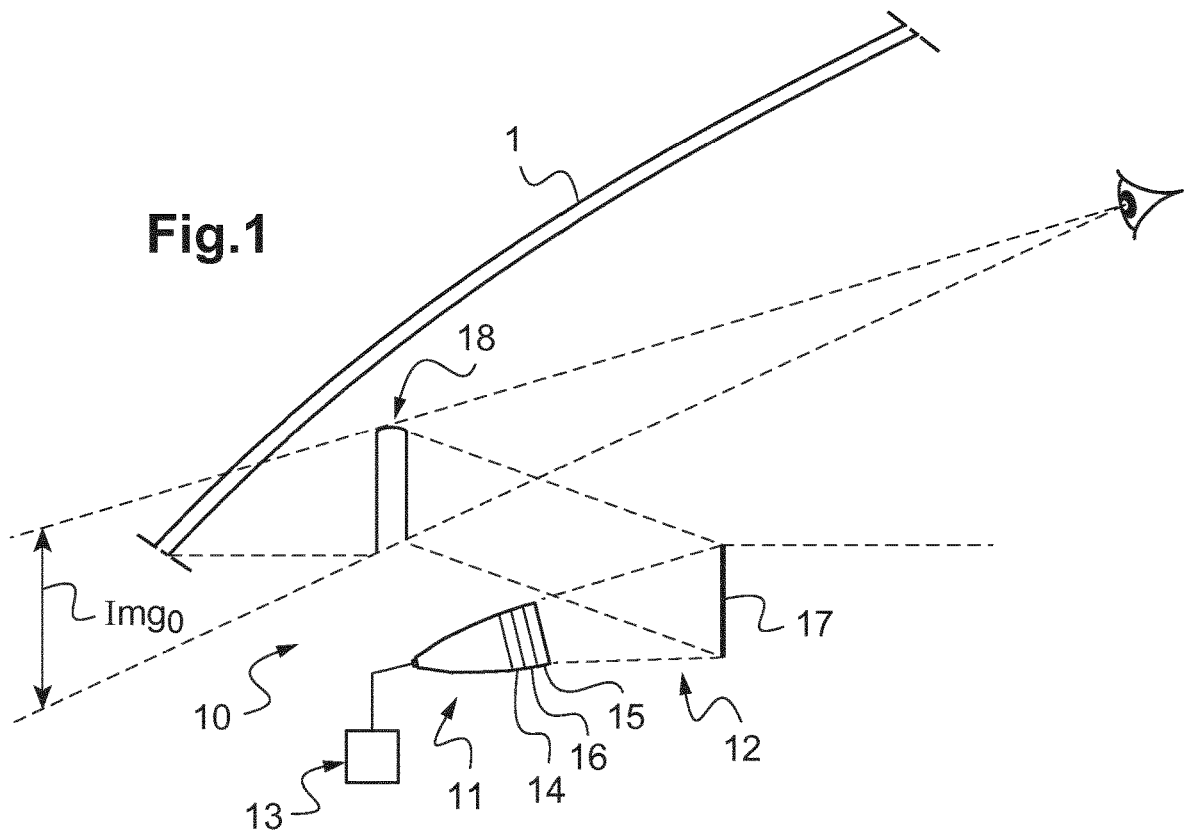
FIG. 1 is a schematic view of a head-up display of a motor vehicle, according to the invention.

As FIG. 1 shows, the optical projection assembly 12 is more specifically designed to project a virtual image $Img_0$ into the visual field of the driver of the vehicle, at a distance from the driver which is greater than that separating the driver from the windshield 1 (so that the eyes of the driver do not have to perform any work of accommodation to perceive the projected information).

In the embodiment represented in FIG. 1, the optical projection assembly 12 to this end comprises an optical return system 17 and a combiner 18 placed in the visual field of the driver of the vehicle.

The optical return system 17, which here comprises only a fold back mirror, makes it possible to return the image generated by the image-generating device 11 to the combiner 18.

The combiner 18 makes it possible to reflect this image in such a way that it appears to the driver as if it were displayed at a great distance therefrom.

Here, this combiner 18 is formed by a semi-reflecting plate which is arranged in the interior of the motor vehicle, between the windshield 1 of the vehicle and the eyes of the driver, and which is dished so as to enlarge the size of the virtual image $Img_0$ seen by the driver.

As a variant, the combiner could be formed by the windshield itself.

The present invention relates more specifically to the image-generating device 11, which is of the type "with light modulation".

To generate an image, such an image-generating device 11 comprises at the very least a light source 14, a light modulator 15 adapted to spatially modulate the light emitted by the light source 14, and a computer 13 adapted to control the light source 14 and the light modulator 15 so that they generate an image.

"Spatially modulate" should be understood to mean that the light modulator 15 is adapted to vary, over at least a part of its surface, the intensity of the light that it transmits to the optical projection assembly 12. It will be considered here that this variation is not binary, in as much as each active part of the light modulator 15 will be able to block the passage of the light or allow this passage, by modulating its intensity, so as to form an image.

The light source and the light modulator could come in different forms.

Figure 2:
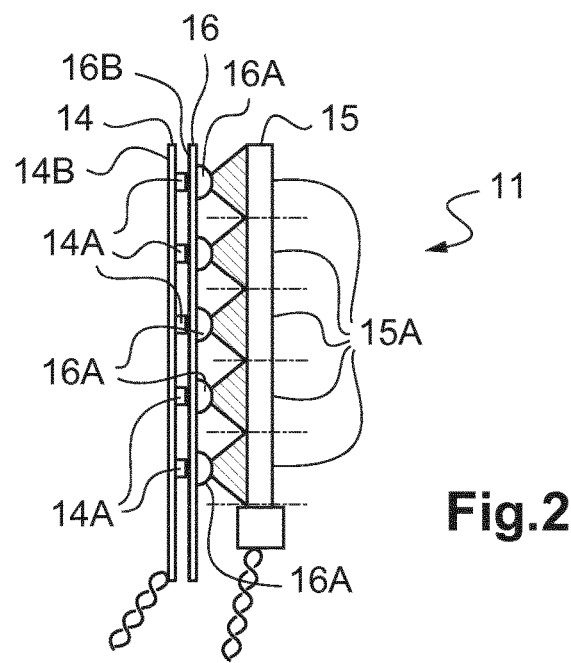
FIG. 2 is a schematic view of a part of the image-generating device of the head-up display of FIG. 1.

In the embodiment represented in FIGS. 1 and 2, the light modulator 15 is of the "transmissive" kind. It comprises a transmissive screen and the light source 14 is adapted to backlight this screen.

As a variant, as will be described later, the light modulator will be able to be of the "reflective" kind.

According to a particularly advantageous feature of the invention, the light source 14 is formed by several distinct light elements 14A, and the computer 13 is adapted to modulate the light intensity emitted by each light element 14A independently of the other light elements 14A.

As FIG. 2 shows, the light source 14 is more specifically here formed by a printed circuit which comprises a support sheet 14B (for example made of bakelite) and, on one face of this support sheet, an array of light-emitting diodes 14A (which form said light elements).

These light-emitting diodes 14A are here distributed matrix-fashion, on at least three rows and at least four columns, and are provided to emit light in mean parallel directions.

They are more specifically here distributed over five rows and nine columns and forty-five light-emitting diodes 14A are therefore provided here.

The printed circuit is, here, designed in such a way that each of these light-emitting diodes 14A is current-controlled independently of the others.

These light-emitting diodes 14A are, here, provided to be controlled between an on state and an off state (preferentially with an intensity that can be modulated). Thus, some of the light-emitting diodes 14A can be on when the others are kept off.

The light intensities emitted by the light-emitting diodes 14A controlled in the on state are, here, designed to be equal.

As was explained above, the light modulator is, here, formed by a transmissive screen 15. As an example, it can be a liquid crystal screen (or LCD, standing for "Liquid Crystal Display") with thin-film transistors (TFT).

As FIG. 2 shows, this screen 15 is situated in a plane parallel to the plane in which the light-emitting diodes 14A are distributed. It is situated at a distance from these light-emitting diodes 14A. According to a variant that is not represented, all or some of the light-emitting diodes are arranged on a curved surface. That makes it possible to select the directivity of the lighting of the diodes. According to this variant, the face of the support sheet 14B which receives the diodes can be totally or partially curved depending on the desired directivity.

The aim here is for each active part (that is to say, here, each liquid crystal) of the screen 15 to be lit, and for it to be lit only by a single light-emitting diode 14A, such that, when this light-emitting diode 14A goes off, no light reaches this active part of the screen 15.

For that, the image-generating device 11 comprises an optical assembly 16 which is interposed between the light source 14 and the screen 15 and which contains the light emitted by each light-emitting diode 14A to a corresponding zone of the screen 15, called effective zone 15A.

As FIG. 2 shows, this optical assembly 16 here comprises, to this end, an array of convergent lenses 16A, each situated in front of one of the light-emitting diodes 14A.

In practice, the optical assembly 16 here comprises a transparent support sheet 16B, which bears forty-five convergent lenses 16A distributed in the same way as the light-emitting diodes 14A.

The convergent lenses 16A of this optical assembly 16 have forms such that each effective zone 15A of the light modulator 15 (which, it will be recalled, is lit by a single corresponding light-emitting diode 14A) has a rectangular form.

Figure 5:
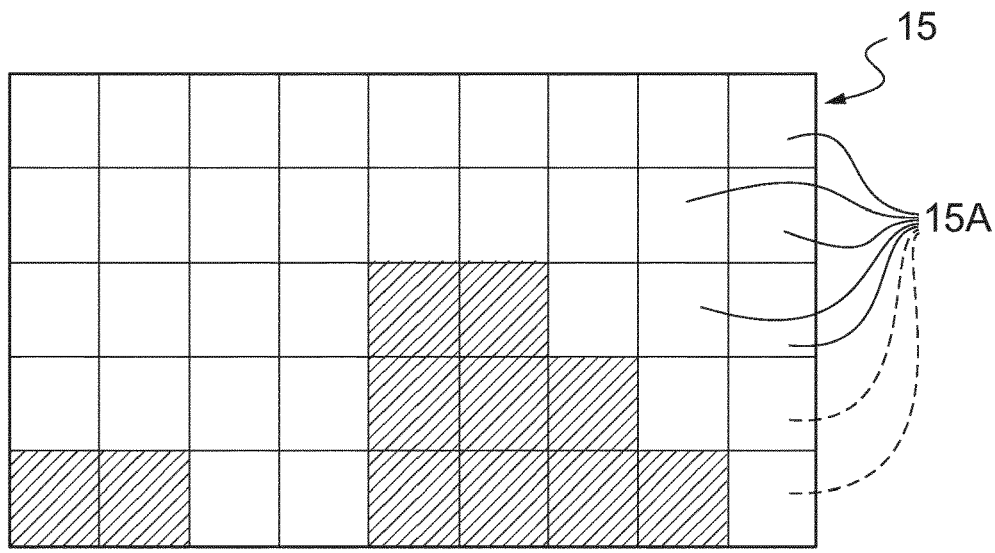
FIG. 5 represents the grid of FIG. 4.

In FIG. 5, the distribution of these effective zones 15A on the screen 15 has been illustrated. It can be seen there that the screen has as many effective zones 15A as there are light-emitting diodes 14A, and that the effective zones 15A are distributed in the same way as the light-emitting diodes 14A.

Thus, the effective zones 15A of the screen 15 are distributed matrix fashion, in five rows and nine columns. They are contiguous such that when all of the light-emitting diodes 14A are on, all of the screen 15 is lit, without showing any dark zone between the effective zones 15A.

Figure 4:
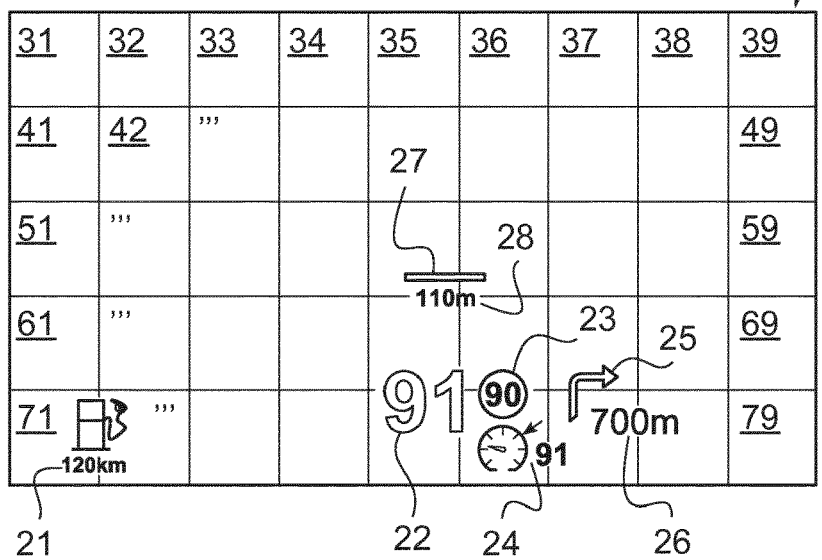
FIG. 4 is a schematic view of the image of FIG. 3, on which a grid is superimposed.

FIG. 4 shows an example of image $Img_1$ that the image-generating device 11 may be required to generate.

By virtue of the grid drawn over this image $Img_1$, it would be understood that it is possible to subdivide this image $Img_1$ into as many parts 31-79 as there are effective zones 15A on the screen 15. Indeed, each part 31-79 of the image $Img_1$ is provided to be formed by an effective zone 15A of the screen 15 lit by a corresponding light-emitting diode 14A.

In the particular example represented in FIG. 4, several pieces of "information" are distinguished on this image $Img_1$, namely:
- fuel level information 21, which corresponds to an estimation of the distance that can still be traveled before running out of petrol,
- instantaneous speed information 22 which corresponds to the instantaneous speed of the motor vehicle,
- speed limit information 23, which corresponds to the speed limit authorized on the road being taken,
- regulation speed information 24, which corresponds to the speed that the driver has programmed on his or her speed regulator,
- direction information 25 which corresponds to the direction of next turn-off,
- distance before turn-off information 26 which corresponds to the distance separating the vehicle from this next turn-off,
- obstacle information 27 here taking the form of a line highlighting the presence of an obstacle, and
- distance information 28 which corresponds to the distance separating the vehicle from this obstacle.

Figure 3:
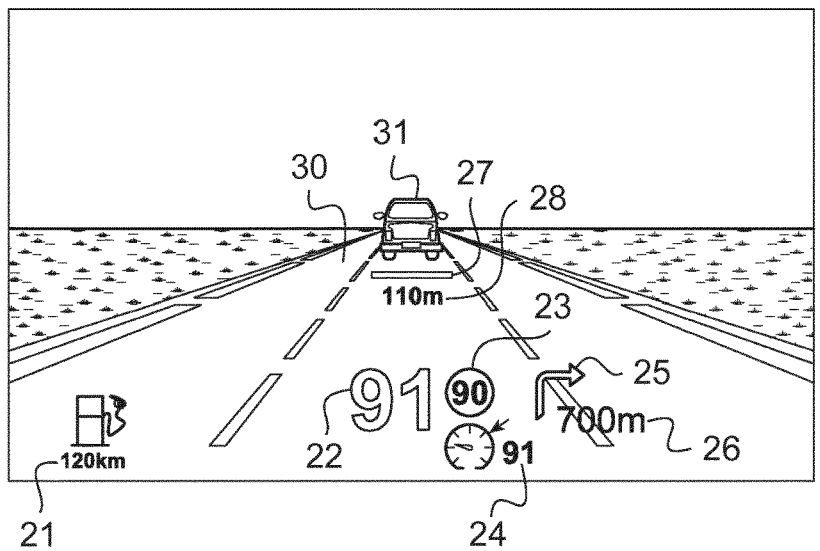
FIG. 3 is a schematic view of an image generated by the head-up display of FIG. 1, as it is seen by a driver, superimposed on the road that the motor vehicle is taking.

In FIG. 3, to clearly illustrate the present invention, it has been schematically represented that the driver can see through the combiner 18, when the image $Img_1$ is projected toward this combiner 18.

It can be seen therein that he or she can see the road 30 which extends in front of him or her and on which a motor vehicle 31 in front (considered here to be an obstacle) is traveling.

He or she can also see, superimposed on the road 30, the image $Img_1$ generated by the image-generating device 11. It is thus understood that the obstacle information 27 (taking the form of a line) makes it possible to emphasize the presence of the motor vehicle 31.

The computer 13 which it will be recalled is designed to control the switching on and the switching off of the light-emitting diodes 14A, independently of one another, and to control the screen 15, so that the head-up display 10 can project useful information into the visual field of the driver, can now be described in more detail.

The computer 13 comprises a processor (CPU), a random access memory (RAM), a read-only memory (ROM), means for acquiring an image to be generated, and an output interface.

By virtue of its acquisition means, the computer 13 is adapted to receive, at regular intervals, an image to be projected into the visual field of the driver, of the type of that represented in FIG. 4.

The read-only memory, for its part, stores data used in the context of the method described below.

It stores in particular a computer application, composed of computer programs comprising instructions whose execution by the processor makes it possible for the computer 13 to implement the method described hereinbelow.

This information application comprises in particular a detection program adapted to check whether, in each part 31-79 of the image to be generated, there is information to be displayed, and a driver program adapted to generate a control set point for the light-emitting diodes 14A and the screen 15.

Finally, by virtue of its output interfaces, the computer 13 is adapted to transmit command signals to the various components of the image-generating device 11, so that the latter projects said image into the visual field of the driver.

The computer 13 is then adapted to implement, repeatedly and at regular intervals, a control method comprising the following steps.

During a first acquisition step, the computer 13 acquires the image to be generated. As an example, it can, for that, transmit to an imaging unit a request signal for the latter to return to it the image to be generated, in the form of a readable file (for example in the "gif" format).

During a second, so-called segmentation step, the computer 13 divided the image into several parts 31-79 (that, it will be recalled, each correspond to an effective zone 15A of the screen 15 and to a particular light-emitting diode 14A of the light source 14).

The computer 13 then checks each part 31-79 of the image, to determine whether there is a part at least of a piece of information 21-28 in each part 31-79 of the image.

As an illustration, in FIG. 5, the effective zones 15A of the screen 15 corresponding to the parts of the image containing information to be displayed have been shaded.

During a third step, the computer 13 generates a control set point for the light source 14 and a control set point for the screen 15.

While the control set point for the screen 15 is generated in a conventional manner (so that its generation will not be described here), the control set point for the light source 14 is generated in a particular manner.

This control set point is generated in such a way that only the light-emitting diodes 14A corresponding to the parts 31-79 of the image in which there is information 21-28 to be displayed are controlled to the on state. The other light-emitting diodes 14A are, for their part, controlled to the off state.

During a final step, the two control set points are transmitted to the light source 14 and to the screen 15.

It will then be understood that, in the example represented in the figures, only eleven of the forty-five light-emitting diodes 14A are controlled to the on state whereas the others are controlled to the off state.

The electrical consumption of the light source 14 is then divided by four compared to that that this same light source would have if all of the light-emitting diodes 14A were controlled to the on state.

The present invention is in no way limited to the embodiment described and represented, but the person skilled in the art will be able to provide any variant thereto in accordance with its spirit.

Thus, by way of example, it would be possible to provide for the light intensities of the light-emitting diodes that are switched on to be modulated, relative to one another. Thus, at least one of the light-emitting diodes could be controlled to develop a light intensity equal to half of the light intensity developed by another of the light-emitting diodes. That would make it possible to modulate the light intensity of the pieces of information displayed relative to one another. As a variant, it will be possible to modulate this light intensity by using, for that, not the light-emitting diodes, but rather the light modulator (15).

According to a variant of the invention, each light element of the light source will be able to be formed not by a single light-emitting diode, but by a group of several light-emitting diodes.

According to another variant of the invention, the optical assembly (that it will be recalled is designed to contain the light emitted by each light element to each corresponding effective zone of the screen) will be able to be formed, not by convergent lenses, but, for example, by partitions extending between the light source and the screen, around each light element.

Again as a variant, as was explained above, the light modulator will be able to be not a transmissive screen but a reflective system. Such a reflective system can for example operate according to an Lcos (liquid crystals on silicon) or DLP (digital light processing) technology. In both of these technologies, provision is made to use a set of "flaps", forming a kind of reflective panel. Each flap is then designed to take two distinct states in order to reflect or not reflect the light toward the optical projection assembly (12).

In this variant, each light-emitting diode will be provided to light a set of flaps. Then, according to the invention, when all of the flaps associated with a light-emitting diode will be controlled to not reflect the light, it would be possible to order the switching off of this light-emitting diode in order to reduce the electrical consumption of the light source.

The invention claimed is:

1. An image-generating device for a head-up display, comprising:
    a light source;
    a light modulator that spatially modulates light emitted by the light source; and
    a computer that controls the light source and the light modulator so that they generate an image, wherein
    the light source is formed by several distinct light elements,
    the image is sub-divided into distinct and independent pieces that are contiguous to one another and that each corresponds to one of the several distinct light elements, and
    the computer modulates a light intensity emitted by each of the light elements independently of one another to independently turn each of the distinct and independent pieces of the image on or off based on information to be displayed on the head-up display.

2. The image-generating device as claimed in claim 1, wherein
    the light modulator comprises a plurality of effective zones that each corresponds to one of the subdivided distinct and independent pieces of the image,
    an optical assembly is interposed between the light source and the light modulator, and
    the optical assembly contains light emitted by each of the light elements to a corresponding one of the effective zones of the light modulator.

3. The image-generating device as claimed in claim 2, wherein each of the effective zones of the light modulator is distinct from one another and contiguous to one another.

4. The image-generating device as claimed in claim 2, wherein each of the distinct and independent pieces of the image is formed by one of the effective zones of the light modulator and by the corresponding light element, wherein the computer comprises:
    means for acquiring the image to be generated,
    detection means adapted to check whether, in each of the distinct and independent pieces of the image, there is the information to be displayed, and
    means for controlling the light source to illuminate only the light elements corresponding to the distinct and independent pieces of the image in which there is the information to be displayed.

5. The image-generating device as claimed in claim 1, wherein the light elements are situated in one and the same plane and are distributed in columns and in rows.

6. The image-generating device as claimed in claim 5, wherein there are provided at least three rows of light elements and at least four columns of light elements.

7. The image-generating device as claimed in claim 1, wherein all or some of the light elements are situated on a curved surface and are distributed in columns and in rows.

8. The image-generating device as claimed in claim 1, wherein the light modulator comprises a transmissive screen and the light source is configured to backlight said transmissive screen.

9. The image-generating device as claimed in claim 1, wherein the light modulator further comprises a reflective panel composed of flaps that can take two distinct states, namely a state in which the flap reflects the light received from the light source in a desired direction and a state in which the flap does not reflect the light received from the light source in said desired direction.

10. A head-up display for a motor vehicle, comprising:
    an image-generating device comprising:
        a light source,
        a light modulator that spatially modulates light emitted by the light source; and
        a computer that controls the light source and the light modulator so that they generate an image, wherein
        the light source is formed by several distinct light elements,
        the image is subdivided into distinct and independent pieces that are contiguous to one another and that each corresponds to one of the several distinct light elements, and
        the computer modulates a light intensity emitted by each of the light elements independently of one another to independently turn each of the distinct and independent pieces of the image on or off based on information to be displayed on the head-up display; and
    a projection system that projects said image into a visual field of a driver of the motor vehicle.

11. The head-up display as claimed in claim 10, wherein the projection system comprises an at least partially reflecting plate which is curved.

12. A method for controlling an image-generating device including a light source formed by several distinct light elements, a light modulator that spatially modulates light emitted by the light source, and a computer that controls the light source and the light modulator so that they generate an image, the method comprising:

receiving, by the computer, the image to be generated, wherein the image comprises at least one piece of an information to be displayed on a head-up display that comprises the image-generating device;

subdividing the image into distinct and independent pieces that are contiguous to one another and that each corresponds to one of the several distinct light elements;

determining, by the computer, which ones of the distinct and independent pieces of the image include all of a portion of the at least one piece of information to be displayed; and generating said image, using the computer, by independently modulating the light intensities of the light elements to independently turn each of the distinct and independent pieces of the image on or off based on the determination.

* * * * *